(12) United States Patent
Okada et al.

(10) Patent No.: US 7,217,042 B2
(45) Date of Patent: May 15, 2007

(54) OPTOELECTRONIC MODULE

(75) Inventors: Takeshi Okada, Osaka (JP); Kyohiro Yoshida, Osaka (JP); Hiromi Nakanishi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 247 days.

(21) Appl. No.: 11/080,767

(22) Filed: Mar. 14, 2005

(65) Prior Publication Data

US 2006/0056781 A1 Mar. 16, 2006

Related U.S. Application Data

(60) Provisional application No. 60/613,426, filed on Sep. 27, 2004.

(30) Foreign Application Priority Data

Sep. 15, 2004 (JP) ............................. 2004/268435

(51) Int. Cl.
*G02B 6/36* (2006.01)

(52) U.S. Cl. .......................... 385/93; 385/88; 385/90; 385/92; 385/94

(58) Field of Classification Search ............... 385/76, 385/77, 78, 88, 89, 90, 92, 93, 94, 14
See application file for complete search history.

(56) References Cited

U.S. PATENT DOCUMENTS

| | | | | |
|---|---|---|---|---|
| 5,924,290 | A * | 7/1999 | Yoshino .................. | 62/3.7 |
| 6,432,733 | B1 * | 8/2002 | Hashizume ............. | 438/22 |
| 6,558,048 | B2 * | 5/2003 | Kuhara et al. ........... | 385/93 |
| 2001/0055451 | A1 * | 12/2001 | Kuhara et al. ........... | 385/93 |
| 2005/0129372 | A1 * | 6/2005 | Zheng ..................... | 385/94 |
| 2006/0056781 | A1 * | 3/2006 | Okada et al. ............. | 385/93 |

* cited by examiner

*Primary Examiner*—Brian M. Healy
(74) *Attorney, Agent, or Firm*—Fish & Richardson P.C.

(57) ABSTRACT

An optoelectronic module having a package encapsulating an optoelectronic device, a triplicated sleeve having a lower metal ring, an intermediate insulating ring and an upper metal cover which are coupled by press-fitting in concentric disposal, and a receptacle fitted upon the upper metal cover. The optoelectronic module does not emit noise radio waves or is not subject to external noise. The module satisfies the stipulated standard that an electric field should be less than 54 dBμV/m at a 3 meter distant measuring spot in a frequency range higher than 1 GHz.

18 Claims, 10 Drawing Sheets

OPTOELECTRONIC MODULE

This application claims the priority of the U.S. Patent Application No. 60/613426 filed on Sep. 27, 2004 which is incorporated herein by reference. Further, this application claims the priority of Japanese Patent Application No. 2004-268435 filed on Sep. 15, 2004, which is incorporated herein by reference.

BACKGROUND OF THE INVENTION

1. Field of the Invention

This invention relates to an optoelectronic module (light emitting device or light receiving device) for allowing the module to be attached to and detached from an external optical fiber. There are two types of optical modules for coupling an optoelectronic device with an optical fiber. One is a receptacle type module. The other is a pigtail type module. The pigtail type faces an end of an intermediate fiber with an optoelectronic device in a housing and permanently fixes the fiber to the housing. The rest of the intermediate fiber projects outward from the module. The other end of the intermediate fiber is fixed in an optical connector which allows a ferrule holding an end of an external optical fiber to detachably combine with. Thus in the pigtail type module, the fiber confronting the optoelectronic device is tightly fixed to the housing of the module.

The receptacle type module couples an optical fiber with an optoelectronic device by mounting the optoelectronic device into a housing having a cylindrical sleeve therein, inserting a ferrule holding an end of an optical fiber via an end hole of the housing, facing the fiber end with the optoelectronic device, aligning the fiber end to the optoelectronic device and fixing the ferrule to the housing. A lot of receptacle type modules have been utilized. Receptacle type modules require alignment of an optoelectronic device, a lens and an optical fiber before fixation of a package including the optoelectronic device, the lens holder and the receptacle for sustaining the ferrule. All the components, the package (stem & lens holder), the sleeve and the receptacle are made of metal.

2. Description of Related Art

A module containing a laser diode has a problem. The laser diode is driven at a driving frequency fd by a driving circuit. The driving frequency fd increases with an increment of the amount of information. High driving frequency induces the module to emit radio wave of the driving frequency fd in air. Nothing serious is not caused by the radiation of the driving frequency radio wave fd from the laser module in usual cases. However, sometimes the radio wave of the driving frequency fd emitted from the laser module acts as noise and causes troubles on other electronic apparatus. Thus, noise emission from laser modules has been regulated by rules. A structural contrivance of prohibiting laser modules from emitting noise radio waves is ardently desired.

There is a standard named FCC Part 15 for regulating properties of optoelectronic modules in the United States of America. FIG. 7 demonstrates an apparatus for measuring radio wave levels at some distance induced by an object optoelectronic module for examining the properties. In an electromagnetism shielding room which inhibits external radio waves from entering, a table 43 is placed upon a reference ground 42. The object optoelectronic module 44 is laid upon the table 43. A stand 45 is laid on the reference ground at a point separated from the module by a standard distance. A horizontal arm 46 is sustained at a height by the stand 45. The height of the arm 46 is adjustable. An antenna 47 is fixed at a front end of the arm 46. The distance from the module 44 to the antenna 47 should be adjusted to a standard length (3 meters or 10 meters). The laser module is driven by a driving circuit with a driving frequency fd, a radio wave of the same frequency fd is emitted from the receptacle of module. The receptacle of the module acts as an antenna. The radio waves flying from the module are caught by the antenna 47 of the measuring apparatus. The measuring apparatus analyzes electric field intensity (dBµV/m) of radio waves per unit frequency and obtains an electric field spectrum sensed by the antenna 47 in the electromagnetism shield test chamber.

The formal standard distance between the object module and the testing antenna is stipulated to be 10 m in the US standard of FCC Part 15. The critical values which should be margins of allowable electric fields are different for frequencies. There are two kinds of standards. One is Class A. The other is Class B. Class B is more rigorous than Class A. Class B requests more sophisticated modules than Class A. The stipulated distance is 10 meters. The 10 m distance requires a very wide electromagnetism shield room. Then the critical electric field intensity is reduced from the 10 m distance values to calculate values of a shortened distance of 3 meters. The reduction from the 10 m distance to the 3 m distance can be done only by relying upon pure physics. A lower frequency range from 10 kHz to 1 MHz induces a difference of about 30 dB between the 10 m distance measurement and the 3 m distance measurement. A higher frequency range from 100 MHz to 10 GHz induces a difference of about 20 dB between the 10 m distance measurement and the 3 m distance measurement. There is a reduction table which determines the relations of allowable margins (critical values) between the 3 m case and the 10 m case. Table 1 denotes the critical values (allowable margins) of Class A and Class B from 30 MHz to 960 MHz on the 3 m distance measurement.

TABLE 1

Frequency-dependent critical electric fields stipulated by FCC Part 15

| Frequency [MHz] | Level [dBµV/m] | |
|---|---|---|
| | Class A | Class B |
| 30–88 | 49.5 | 40 |
| 88–216 | 54 | 43.5 |
| 216–960 | 56.9 | 46 |
| 960< | 60 | 54 |

Class B proposes more rigorous request than Class A. Thus, Class B matters for the present invention. Attention should be paid to Class B. The US standard requires electric fields less than the stipulated critical values in the whole radio wave spectrum. Background noise (natural noise) is always less than the above-listed values. What matters is the noise at the driving frequency fd at which laser diodes (LDs) or light emitting diodes (LEDs) are driven. When a driving circuit supplies an AC driving current of fd to LDs or LEDs, the driven module emits a radio wave of the driving frequency fd. The emitted radio waves are strengthened with an increase of the driving frequency fd. Here, fd=10.312 MHz is employed as an example of the driving frequency fd at which a laser diode is driven.

In the measurement, the antenna should receive radio waves ranging from 30 MHz to 18 GHz and the measuring apparatus should investigate intensity of an electric field per frequency (electric field spectrum of radio waves). The most significant matter is noise intensity at the driving frequency fd, because the driving circuit may emit a strong radio wave of the driving frequency in air via the module. The allowable upper limit in a range above 960 MHz is 54 dBµV/m in accordance with Class B of FCC Part 15. The electric field caused by optoelectronic modules should be lower than 54 dBµV/m at the driving frequency fd. However, the modules entirely built by metallic parts overreach the critical value. The whole metal modules cannot satisfy the stipulated standard of FCC Part 15, Class B. One purpose of the present invention is to provide an optoelectronic module which satisfies the above-listed standard of FCC Part 15, Class B.

No single antenna can receive such a wide range of radio waves. The measuring apparatus makes use of two kinds of antennae. 30 MHz to 1 GHz radio waves are caught by a bilog antenna. 1 GHz to 18 GHz radio waves are detected by a horn antenna. The spectrum of radio waves emitted from optical modules is measured by an apparatus having the two kinds of antennae and a spectrum analyzer in the electromagnetism shield chamber.

Japanese Utility Model Laying Open No. 4-130460, "OPTOELECTRONIC RECEPTACLE MODULE" proposed an optoelectronic module having an insulator between a package including an optoelectronic device and a receptacle holding an end of an optical fiber.

Insertion of the insulator had purposes of avoiding occurrence of troubles on the optoelectronic device at welding and enabling the module to be applied to both a +5V power source and a −5V power source.

FIG. 6 denotes a sectional view of the proposed module. The module includes a cylindrical receptacle 60 which allows an optical fiber to be attached to or detached from, a cylindrical holder 58 welded to the receptacle 60, a package (55, 56, 57) welded to the holder 58, and an optoelectronic device 50 supported in the package (55, 56, 57). What is important is that the package is divided into three parts (55, 56, 57) in the vertical direction. An upper metal ring 57 and a lower metal ring 55 sandwich a middle insulating ring 56 in the package. An adhesive glues the insulating ring 56 to both the upper metal ring 57 and the lower metal ring 55.

The insulating ring 56 divides the package into two metallic parts 55 and 57. The lower metal ring 55 sustains the optoelectronic device 50. The upper metal ring 57 connects the package to the cylindrical holder 58 and the columnar receptacle 60.

Thus the insulating ring 56 electrically separates the optoelectronic device 50 from the receptacle 60. The receptacle 60 has axial holes 66 and 65 for attaching a ferrule holding an end of an optical fiber. A narrower hole 64 follows the axial holes 65 and 66. A cylindrical lens 63 is fixed at an end of the series of axial holes for converging signal light on the fiber end or the optoelectronic device.

Japanese Utility Model Laying Open No. 4-130460 aimed at avoiding troubles on optoelectronic device induced by welding of the receptacle on the package and caused by contact with other metallic parts at a high voltage. Japanese Utility Module Laying Open No. 4-130460 is indifferent to the stipulated standard of FCC Part 15. No document other than this has found out. Thus Japanese Utility Module Laying Open No. 4-130460 has been cited here.

Japanese Utility Model Laying Open No. 4-130460 electrically separates the receptacle 60 from the optoelectronic device 50 by inserting the insulator 56 midway in the package of the module. The purpose of the interposition of the insulator is to separate the optoelectronic device from the voltage of the receptacle 60, to prevent welding from inducing troubles in the optoelectronic device, to allow both a +5V power source and a −5V power source to drive the optoelectronic module, to suppress shortcutting by a contact with other devices, and to prevent troubles from occurring on operation.

Japanese Utility Model Laying Open No. 4-130460 is different from the present invention in purposes. The present invention aims at suppressing a module from emitting electromagnetic noise to surroundings. Japanese Utility Model Laying Open No. 4-130460 is indifferent to radio noise pollution induced by its own module. Japanese Utility Model Laying Open No. 4-130460 and the present invention, however, have a common contrivance of sandwiching an insulator by the receptacle and the optoelectronic device. The prior art reference is cited now for the reason. No module proposed by Japanese Utility Model Laying Open No. 4-130460 has been produced. Perhaps the assumed necessity of driving the module by binary power sources of +5V and −5V has never been urgent till now.

No actual product has been yet produced by teaching of Japanese Utility Model Laying Open No. 4-130460. Nobody has been aware of actual drawbacks of Japanese Utility Model Laying Open No. 4-130460. The lower package part 55 carrying the optoelectronic chip, the insulating ring 56 and the upper package part 57 are glued at sticking planes 68 and 69 by an adhesive. The holder 58 is welded upon the upper package part 57 at a junction surface 59. The receptacle 60 is welded to the holder at a junction plane 62. The parts are aligned by introducing a light beam along an axial line and are fixed at optimum relative positions. A high degree of freedom of combination in the horizontal direction is an advantage.

On the contrary, Japanese Utility Model Laying Open No. 4-130460 has difficulties;
(1) rigorous precision of assembling package parts,
(2) unstable temperature dependence, and
(3) low reliability.

The above difficulties are induced by the following reasons. Thermal expansion coefficients are quite different for the upper/lower metal parts 55/57 and the insulator 56. Changes of temperature cause expansion or contraction of the insulating part 56 and the metal parts 57/55. The degrees of expansion and contraction are different. Difference of deformation induces axis misalignment and peeling of an adhesive. Neither welding nor soldering is competent for coupling an insulator to metal parts. Japanese Utility Model Laying Open No. 4-130460 glues the insulator to the metal parts with the adhesive. But the adhesive has poor reliability. Shear stress induced by thermal expansion or shrinkage would peel the adhesive.

It is unclear whether a structure of the module made in accordance with the teaching of Japanese Utility Model Laying Open No. 4-130460 satisfies the regulated standards stipulated by FCC Part 15.

SUMMARY OF THE INVENTION

An optoelectronic module of the present invention includes an optoelectronic device, a package consisting of a lens holder and a stem for holding the optoelectronic device, a receptacle to be attached to or detached from a ferrule of a fiber, and a sleeve connecting the receptacle and the package, wherein the sleeve is divided in radial & vertical directions into three rings, an upper metal cover, an insulating ring and a lower metal ring. The three components of the sleeve are coupled by press-fitting.

Instead of dividing the package enclosing an optoelectronic device into three parts, the present invention divides the sleeve coupling the package with the receptacle into three parts and gives the insulating ring as a middle sleeve part. Instead of insulating the package, this invention insulates the sleeve. The sleeve is composed of an upper metal cover, an insulating ring and a lower metal ring in the present invention. Since the three parts building the sleeve are concentric cylindrical rings, the three parts enable us to unify the three parts into a single sleeve by press-fitting. The present invention relies upon neither welding nor adhesive. The press-fitting is superior in precision and sturdiness to welding and adhesion. The press-fitting can eliminate the step of alignment for the components of the sleeve. The sleeve has three components. The preparatory press-fitting enables us to treat the sleeve as a single part.

Since the insulating annulus is inserted in the middle of the sleeve, electric signals are not transmitted from the optoelectronic device to the receptacle. The receptacle is a large part and plays a role of an antenna for emitting radio wave of a frequency of an LD driving signal. The voltage of the receptacle can be kept to the ground level. Otherwise, the receptacle can take an arbitrary DC voltage. A floating level is also allowable to the voltage of the receptacle. In any case, the receptacle level is free from the driving frequency. Therefore, no driving signal of driving the light source propagates in the environments via the receptacle as an antenna. When electric field is measured at a spot distanced by 3 m or 10 m from the module, the spectrum of the electric field is loss than the allowable standard even at the driving frequency. The present invention enables the optoelectronic module to satisfy the standard determined by the FCC Part 15 Class B.

Since the three components are combined by press-fitting into one sleeve, no alignment among the components is necessary. The combination requires no adhesive. The press-fitting without adhesive enhances reliability of the module.

What requires alignment in x and y directions is only the junction between the receptacle and the sleeve in the present invention. Conventional whole-metal type modules also require the sleeve/receptacle alignment. The present invention causes no increase of alignment parts and alignment operations. The present invention is equivalent to the conventional overall-metal modules.

DETAILED DESCRIPTION OF THE PREFERRED EMBODIMENTS

Figure 1:
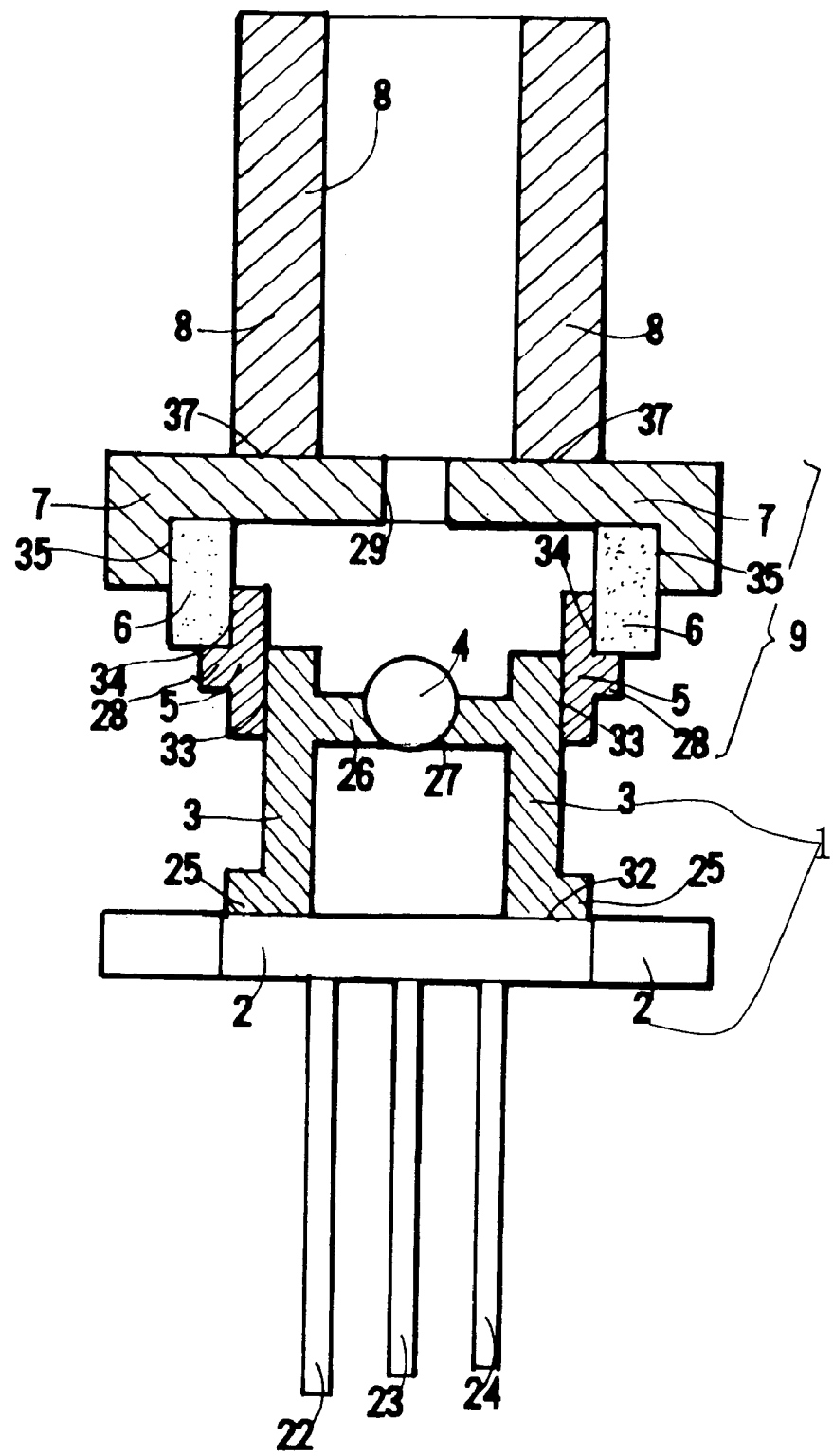
FIG. 1 is an enlarged sectional view of a stem, a lens holder, a sleeve part and a receptacle of an optoelectronic module as an embodiment of the present invention.

An optoelectronic module of the present invention is described by referring to FIG. 1. A stem 2 is a metallic disc on which an optoelectronic device (not shown in the figure) should be mounted. The optoelectronic device means a collective concept denoting either light emitting devices or light receiving devices. The light emitting devices include a light emitting diode (LED) and a laser diode (LD). The light receiving devices include a photodiode (PD), an avalanche photodiode (APD) and a pin photodiode.

An origin of noise generation is a driving circuit of a light emitting device. A light emitting module (LED, LD) is more significant to the regulation stipulated by FCC Part 15 than a light detecting module (PD, APD). Suppression of noise emission should be contrived upon a structure of light emitting modules. A similar structure can be applied to light receiving modules. Provision of the noise suppressing structure enables the light detecting module to acquire a strong resistance against external noise.

A lens holder 3 having a top is welded upon the metal disc stem 2. The disc stem 2 and the lens holder 3 compose a package 1. A top portion 26 of the lens holder 3 has a hole 27. The hole 27 sustains a ball lens 4. A sleeve 9 is press-fitted on an upper part of an outer wall of the lens holder 3. The sleeve 9 is composed of three annular parts. An inner one is a lower metal ring 5 having the narrowest inner diameter. A middle one is an insulating cylindrical ring 6 having an intermediate inner diameter. A outer one is an upper metal disc-like cover 7 having the widest inner diameter. The reason why the upper metal cover 7 has a shape of a disc is that a receptacle shall be placed on the upper disc-shaped metal cover 7. A tubular receptacle 8 is welded upon the upper metal cover 7.

The triplicate sleeve 9 has the metal rings 5 and 7 at upper/outer and lower/inner portions and the insulating ring 6 at a middle height/diameter portion. The triptych is coupled in a body by press-fitting. The lower metal ring 5 has an outer circular protrusion 28 for stopping a lower end of the insulating ring 6. The outer protrusion 28 regulates an intrusive depth of the insulating ring 6 on the metal ring 5. An upper end of the insulating ring 6 is in contact with the upper metal cover 7. Vertical disposition of the triplets of the sleeve is rigorously determined by the insulating ring 6 and the protrusion 28. There is no room for adjustment. The sleeve 9 enables the three rings 5, 6 and 7 to maintain a precise mutual relation. An outer surface of the lower metal ring 5 is seized by an inner wall of the insulating ring 6 at a press-fitting plane 34. The coupling requires no adhesive. An outer surface of the insulating ring 6 is arrested by an inner wall of the metal cover 7 at another press-fitting plane 35. No adhesive is required also.

FIG. 1 depicts that the top of the lower metal ring 5 is level with the bottom of the upper metal cover 7. This demonstrates an allowable limit of the vertical relation between the bottom of the upper cover 7 and the top of the lower ring 5. The top of the lower ring 5 should be equal to or higher than the bottom of the upper ring 7 in height. If the top of the lower metal ring 5 were lower than the bottom of the upper metal cover 7, a strong stress obliquely would act upon the insulating ring 6 and would break down the insulating ring 6. For avoiding the trouble, the top of the lower metal ring 5 should not be lower than the bottom of the upper metal cover 7.

A foot 25 of the lens holder 3 has a contact plane 32 with an upper surface of the stem 2. The lens holder 3 is aligned and welded upon the stem 2 at the contact plane 32. An upper outer wall of the lens holder 3 has a contact portion 33 with an inner/lower wall of the lower metal ring 5. The lens holder 3 is welded at the contact portion 33 to the lens holder 3. An upper/outer wall of the lower metal ring 5 has a contact plane 34 with a foot of the insulating ring 6. The insulating ring 6 is press-fitted to the lower metal ring 5 at the contact plane 34. A top of the insulating ring 6 is press-fitted into a foot flange of the upper metal cover 7 at the press-fitting plane 35. A foot of the receptacle 8 has a contact surface 37 with a top of the metal cover 7. The receptacle 8 is aligned and welded on the metal cover 7 at the contact surface 37.

The present invention interposes an insulator to the sleeve 9 between the receptacle 8 and the lens holder 3 by dividing the sleeve 9 into three parts composed of the metal ring 5, metal cover 7 and insulating ring 6. The insulating ring 6 cuts electric current off. The insulating ring 6 electrically separates the receptacle from the package (lens holder+ stem) encapsulating the optoelectronic device. A conventional overall-metallic optoelectronic module allows the receptacle to play a role of an antenna of radiating a high frequency radio wave having the same frequency as the driving current and allows the noise radio wave to induce troubles upon other apparatus. The present invention prevents the receptacle from acting as an antenna and inhibits the noise radio wave of the driving frequency from radiating to the surroundings.

Figure 2:
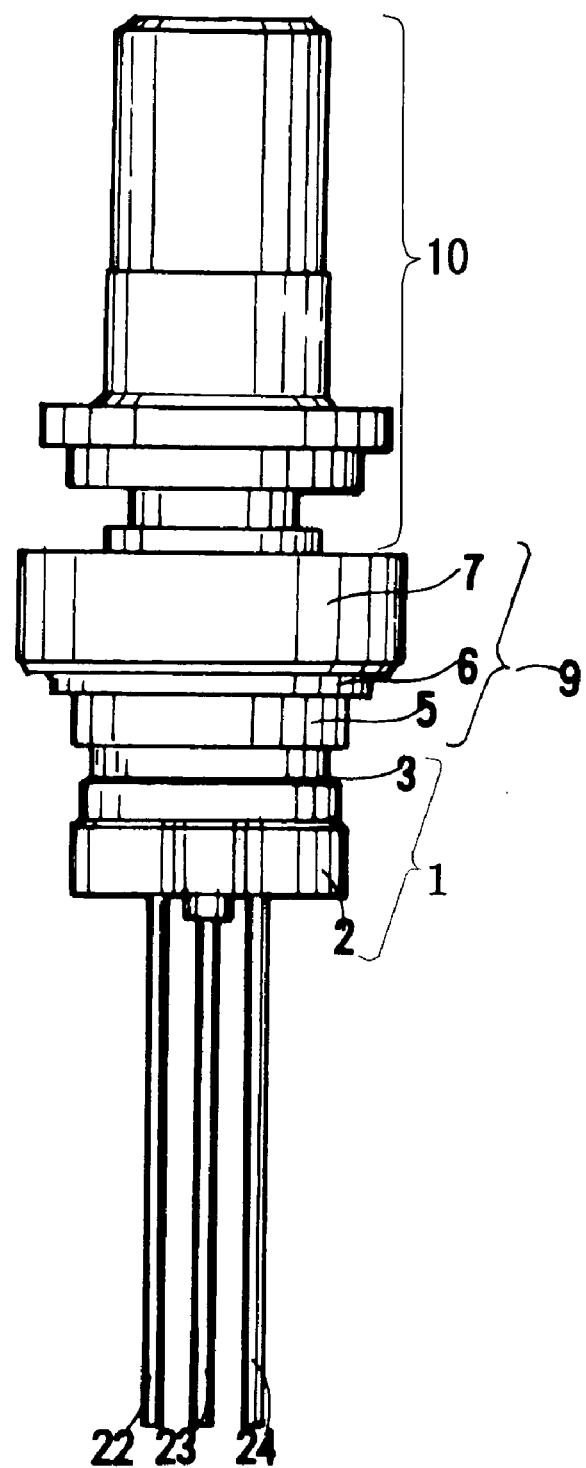
FIG. 2 is a front view of the whole of the optoelectronic module of the embodiment including the stem, the lens holder, the sleeve part and the receptacle.

FIG. 2 shows a front view of the optoelectronic module as an embodiment of the present invention. Leadpins 22, 23 and 24 extrude from a bottom of a stem 2 which is a metal disc. A lens holder 3 is fitted upon the metal stem 2. A complex sleeve 9 is fixed upon the lens holder 3. The complex sleeve 9 is composed of a lower metal ring 5, an insulating ring 6 and an upper metal cover 7. A tubular receptacle 10 is fitted upon the metal cover 7. The receptacle 10 has an axial opening for allowing a ferrule of a fiber to be attached into or detached from.

Sizes of the embodiment are described. The full length from the top of the receptacle 10 to the bottom of the leadpins 22, 23 and 24 is 18.42 mm. The length of the receptacle 10 is 7.05 mm. The full height of the triplicate sleeve 9 is 2.60 mm. An outer diameter of the upper metal cover 7 is 5.20 mm. An outer diameter of the stem 2 is 3.90 mm. An outer diameter of the insulating ring 6 is 4.50 mm. An inner diameter of the top opening of the receptacle 10 is 1.25 mm.

Figure 3:
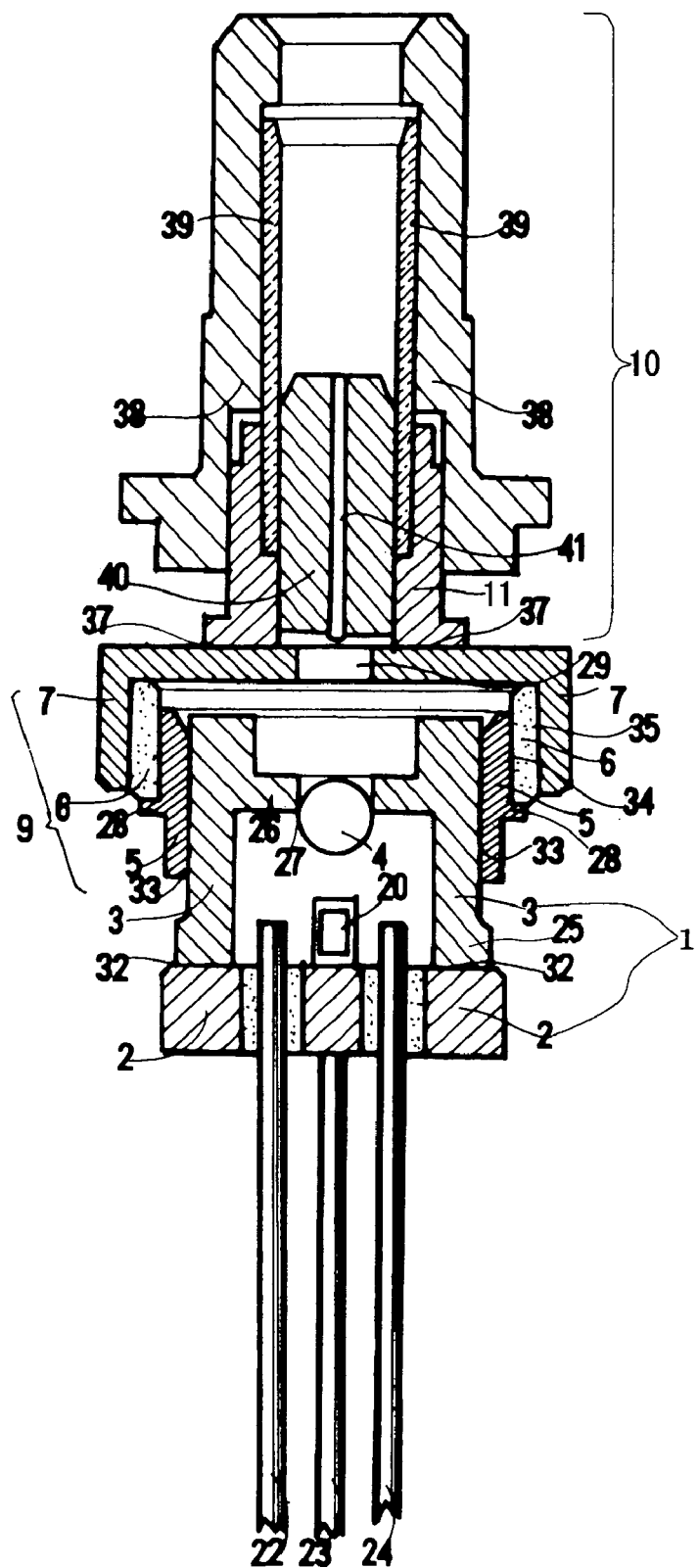
FIG. 3 is a sectional view of the whole of the optoelectronic module of the same embodiment including the stem, the lens holder, the sleeve part and the receptacle.

FIG. 3 demonstrates a section of the optoelectronic module of FIG. 2. The FIG. 2 module has a different relation among three parts of the sleeve to the FIG. 1 module. A disc-shaped stem 2 is a base for mounting an optoelectronic device 20 which is one of a semiconductor laser, a light emitting diode, a photodiode, a pin-photodiode or an avalanche photodiode. The stem 2 sometimes includes a monitoring photodiode in the case of a laser diode, an amplifier IC in the case of a photodiode (pin, avalanche). A lens holder 3 is fitted upon the stem 2. The stem 2 and the lens holder 3 compose a package 1.

Resistance welding is suitable for welding the lens holder 3 to the stem 2 at a welding plane 32. A hole 27 of an upper wall 26 of the lens holder 3 sustains a lens 4. A sleeve 9 is welded on an upper/outer surface of the lens holder 3. The sleeve 9 is composed of a lower metal ring 5, an insulating ring 6 and an upper metal cover 7. The insulating ring 6 is press-fitted to an outer/upper wall of the lower metal ring 5. The upper metal cover 7 is press-fitted to an outer/upper wall of the insulating ring 6. The combination of the triplicated sleeve dispenses with adhesive. An inserting depth of the insulating ring 6 is exactly determined by an outer circular protrusion 28 on the lower metal ring 5. The protrusion 28 is a position-regulating projection.

Figure 11:
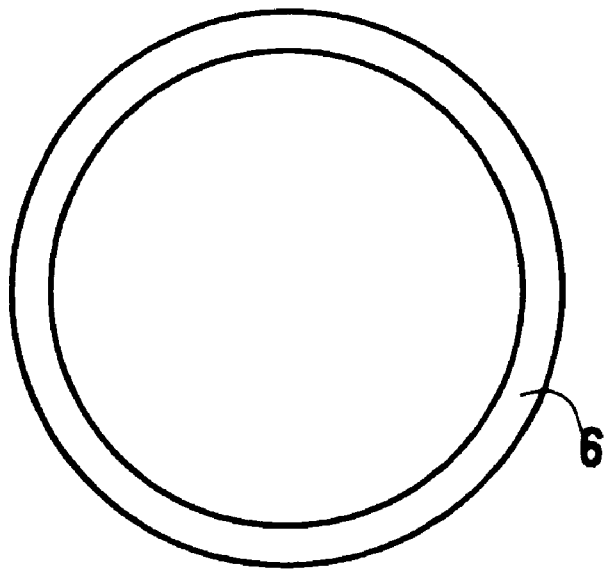
FIG. 11 is a plan view of an insulating ring having a shape of a full circle.

The insulating ring 6 should not be made of plastics. Plastic is incompetent due to lack of mechanical toughness. The insulating ring should be combined with the metal rings by press-fitting. The insulating ring should maintain its own inherent shape by itself. Ceramics with high rigidity and toughness are suitable for a material of the insulating ring 6. A preferable candidate is zirconia ($ZrO_2$). In this case, the insulating ring may be called a zirconia ring. Alumina ($Al_2O_3$) is another candidate. The lower metal ring 5 is made of, for example, SUS-SF20T. The upper metal cover 7 is made of, e.g., SUS-SF20T. SUS-SF20T is one of ferromagnetic stainless steels. The insulating ring can be formed into a full circle, as shown in FIG. 11. The full circle ring has sufficient sturdiness. However, the full circular insulating ring sometimes causes crazings to occur in the insulating ring in press-fitting.

Figure 12:
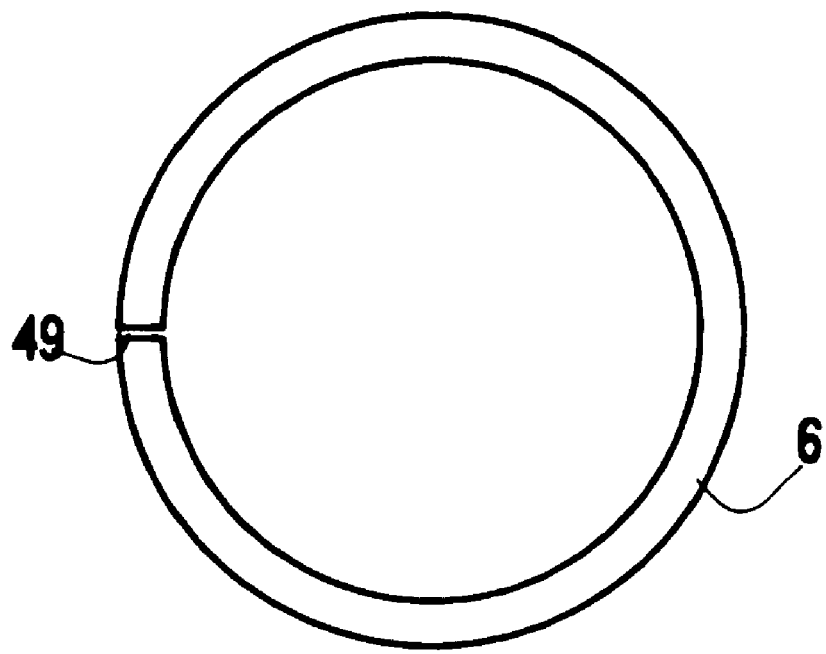
FIG. 12 is a plan view of another insulating ring having a shape of a gapped circle.

If a part of the insulating ring is cut off, no crazing is induced by press-fitting. FIG. 12 demonstrates an example of an insulating ring 6 having a gap 49 which allows the insulating ring to avoid crazings. However, the existence of the gap 49 reduces the strength of the insulating ring 6 a little. The upper metal cover 7 is preferably made of a ferromagnetic material. Ferromagnetism enables the upper metal cover 7 to reduce noise by absorbing magnetic components of noise. The upper metal cover 7 can decrease noise by converting electric components of noise to eddy currents and dissipating the eddy current power. A ferromagnetic upper metal cover 7 is more effective for preventing electromagnetic waves from leaking.

A cylindrical receptacle 10 is mounted upon the upper metal cover 7. The receptacle 10 includes a stab holder 11, a housing 38, a zirconia sleeve 39, a stab 40 and a dummy fiber 41. Ends of the stab 40 and the dummy fiber 41 are slantingly ground and polished for reducing reflected-laser-returning light. An undepicted ferrule holding an end of an outer optical fiber will be inserted into the front opening of the receptacle 10. The ferrule will become in contact with the front of the stab 40. Signal light directly transfers from the outer optical fiber into the dummy fiber 41 and vice versa.

If the optoelectronic device 20 is a light emitting device (LED or LD), signal light emitted from the light emitting device 20 is converged by the lens 4 at an end of the dummy fiber 41. The light passes the dummy fiber 41, goes out of the other end and transfers into an external fiber. The signal light goes on its way in the fiber to a central station.

If the optoelectronic device 20 is a light detecting device (PD or APD), signal light propagating in an external fiber goes into one end of the dummy fiber 41, passes the fiber 41, goes out of the other end, and disperses in a free space. The dispersed signal light is converged by the lens 4 to a light detection device 20.

A hole 29 of the upper metal cover 7 is a hole through which signal light goes. A diameter of the hole 29 is 0.5 mmφ in the embodiment. Too narrow a hole 29 increases the difficulty of alignment. Thus the lower limit of the diameter of the hole 29 is 0.2 mmφ. Too wide a hole 29 allows noise radio waves to escape from the module via the hole forward. The upper limit of the diameter of the hole 29 is 1.2 mmφ. The hole diameter ranges from 0.2 mmφ to 1.2 mmφ. 0.5 mmφ is the optimum value of the hole 29.

As described before, one of the purposes of the present invention is to provide an optoelectronic module which has high resistance against external noise caused by driving ICs. For example, optical links often include optoelectronic devices which have driving ICs therebehind. An optical communication system transmitting signals via optical fibers at a rate of e.g., 1 Gbps drives a driving IC by a clock of 1 GHz. The driving IC causes noise of 1 GHz. It is the purpose of the present invention to give such an optoelectronic module which is immune from the noise.

Figure 8:
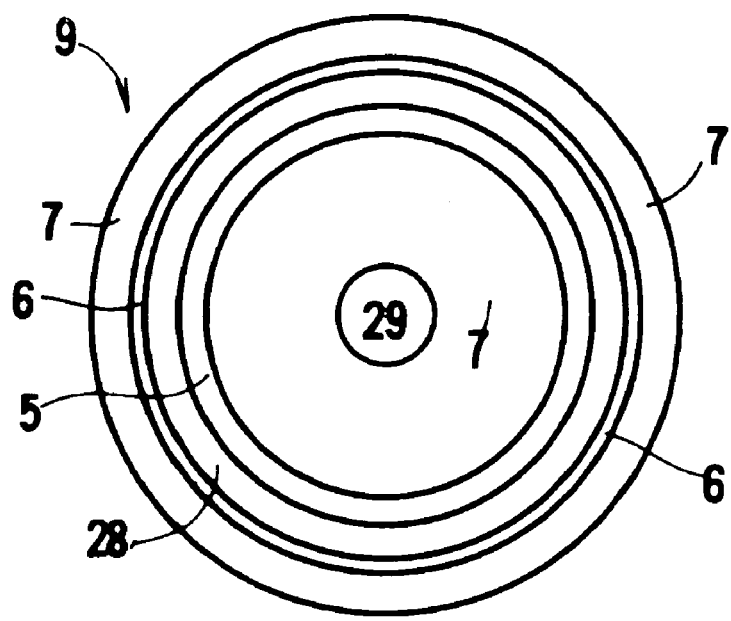
FIG. 8 is a bottom view of a sleeve part of an embodiment made by unifying a lower metal ring and an insulating ring into an upper metal cover by press-fitting.
Figure 9:
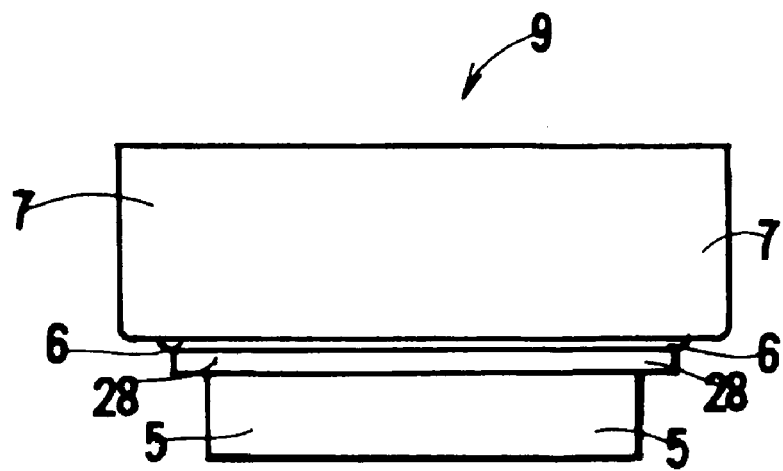
FIG. 9 is a front view of the sleeve part of the embodiment made by unifying the lower metal ring and the insulating ring into the upper metal cover by press-fitting.
Figure 10:
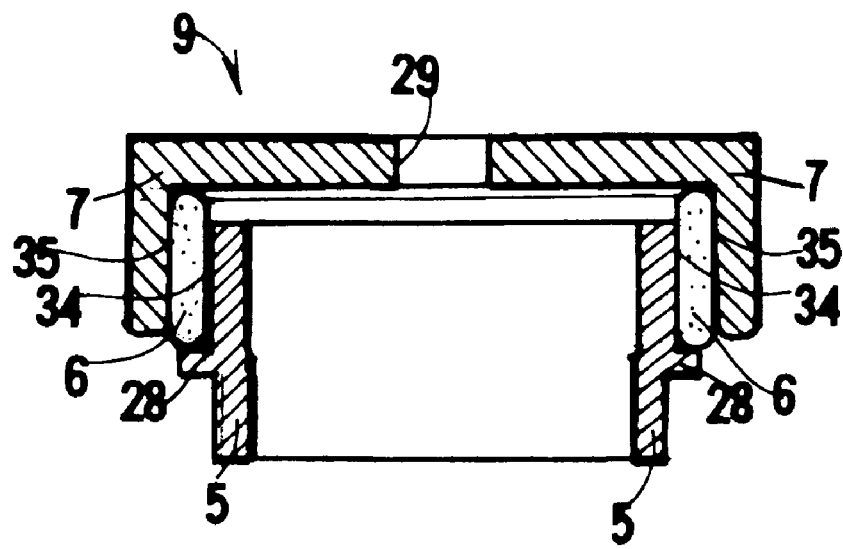
FIG. 10 is a sectional view of the sleeve part of the embodiment made by unifying the lower metal ring and the insulating ring into the upper metal cover by press-fitting.

FIG. 8 is a bottom view of a sleeve part. FIG. 9 is a front view of the sleeve part. FIG. 10 is a sectional view of the sleeve part. In the embodiment, the upper metal cover 7 is a flanged metal disc (ferromagnetic metal) of an outer diameter of 5.20 mmφ. An insulating ring 6 (e.g., zirconia ring) is inserted into an inner hole of the flange of the metal cover 7. An lower metal ring 5 with a cylindrical shape is inserted into an inner hole of the insulating ring 6. The insulating ring 6 is chamfered at inner/outer and top/bottom edges for facilitating press-fitting of the insulating ring 6 and the lower metal ring 5. The distance (total height of the sleeve part) from the top of the upper metal cover 7 to the bottom of the lower metal ring 5 is 2.60 mm. The thickness of the insulating ring 6 is 0.3 mm (outer diameter of 4.50 mmφ and inner diameter of 3.90 mmφ in the embodiment.

Figure 7:
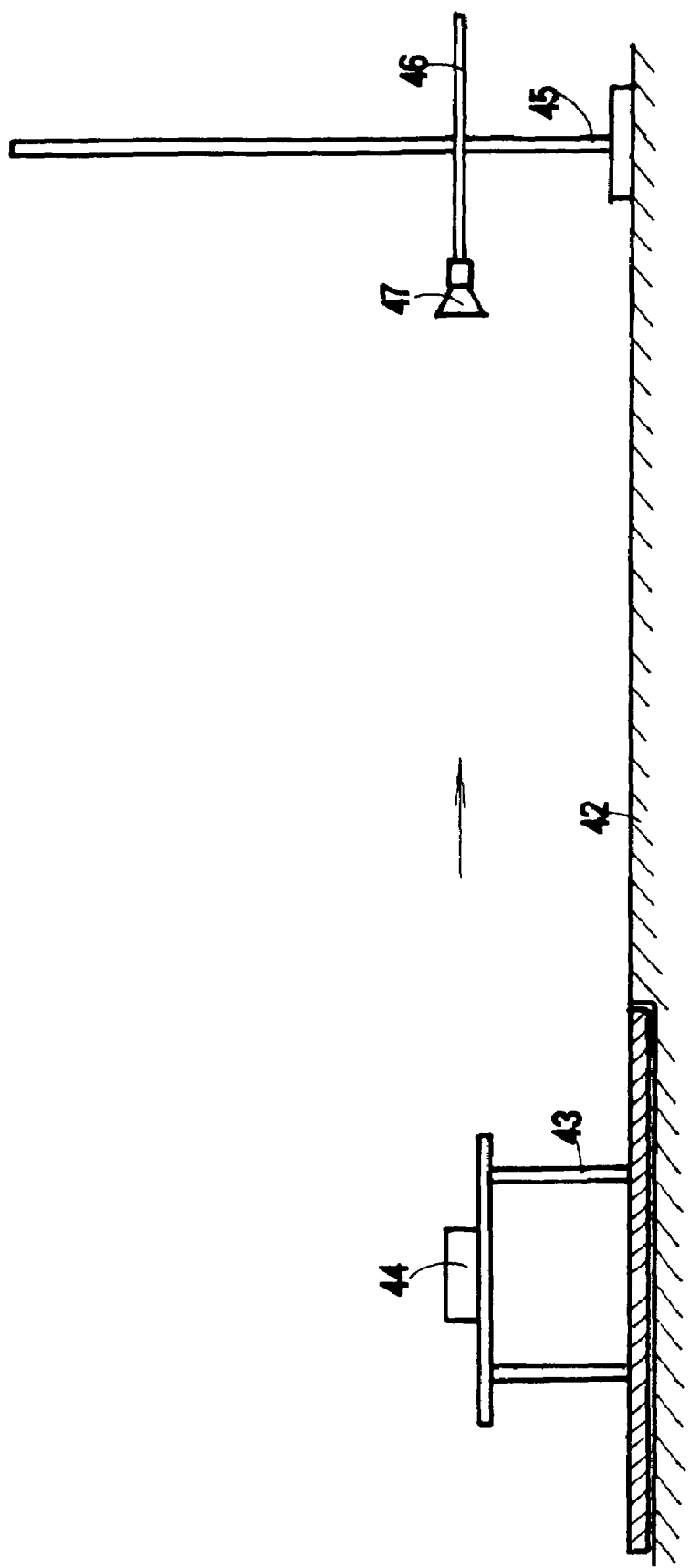
FIG. 7 is a schematic view of disposal of an experiment of radio wave measurement having a table sustaining an object optoelectronic module thereupon, an antenna placed at a point distanced by 3 m from the object module for catching radio waves emitted from the object module, and a processor of producing a radio wave spectrum of the radio waves.

Spectra of 3 meter distance noise induced by an insulator-carrying optoelectronic module of the present invention and a prior art non-insulator optoelectronic module are measured by using a radio wave detector shown in FIG. 7 in an electromagnetic shield chamber. An antenna is placed at a point distanced by 3 meters from the optoelectronic module.

Figure 4:
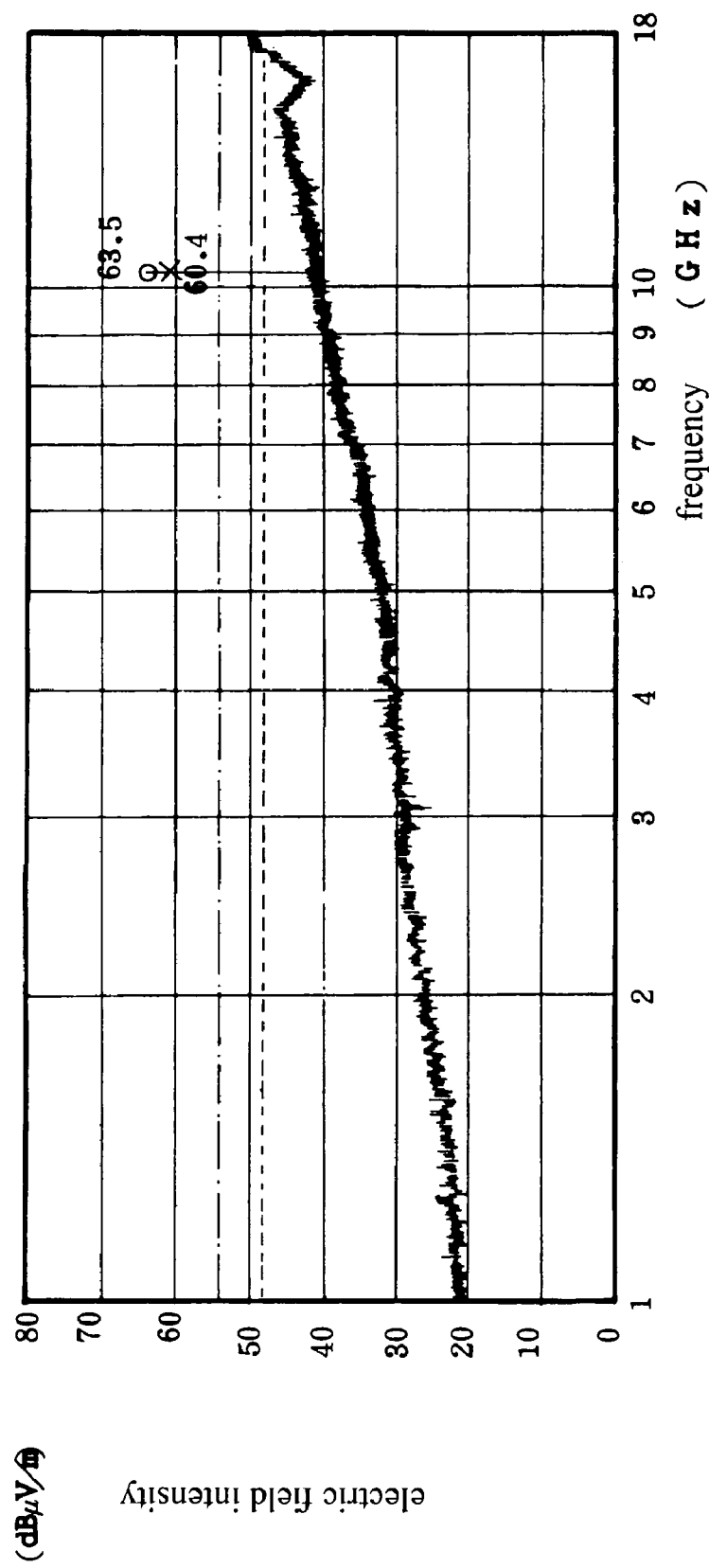
FIG. 4 is a graph of an electric field spectrum from 1 GHz to 18 GHz induced by a prior art allover-metallic optoelectronic module without an insulating ring driven at a fd=10.312 GHz frequency and measured per frequency by an antenna distanced by 3 meters from the optoelectronic module. The spectrum shows a high noise peak of 63.5 dBμV/m (○) at the driving frequency fd=10.312 GHz, which overruns the standard critical value of 54 dBμV/m. The prior art module does not satisfy the standard.

FIG. 4 shows an intensity spectrum of electromagnetic waves emitted from the prior art laser-holding optoelectronic module without an insulating ring measured by the apparatus shown in FIG. 7 placed in the electromagnetic shield chamber. The distance between the antenna and the module is 3 meters. The abscissa is a frequency (GHz). The ordinate is electric field intensity (dBµV/m). The afore-mentioned standard "Class B" requires that noise intensity should be less than 54 dBµV/m at frequencies over 1 GHz. A single-dotted line denotes a margin of 54 dBµV/m in FIG. 4. In the experiment, a laser diode is driven by a signal of a frequency of fd=10.312 GHz.

The graph shows small electric field intensity of about 20 to 30 dBµV/m between 1 GHz and 3 GHz. This is natural background noise. An increase of a frequency induces a rise of the electric field. The electric field is less than 40 dBµV/m between 3 GHz and 10 GHz. This is also natural background noise. A significant problem is noise intensity at the driving frequency of fd=10.312 GHz. A round dot (○) shows strong 63.5 dBµV/m noise of a component with horizontal electric field vectors at fd=10.312 GHz. The 63.5 dBµV/m horizontal noise overruns the critical value 54 dBµV/m.

A cross dot (x) shows strong 60.4 dBµV/m noise of another component with vertical electric field vectors at fd=10.312 GHz. The 60.4 dBµV/m vertical noise also overruns the critical value 54 dBµV/m. Prior art allover metallic modules do not satisfy the standard requiring for small noise less than 54 dBµV/m in all reference frequencies.

Figure 5:
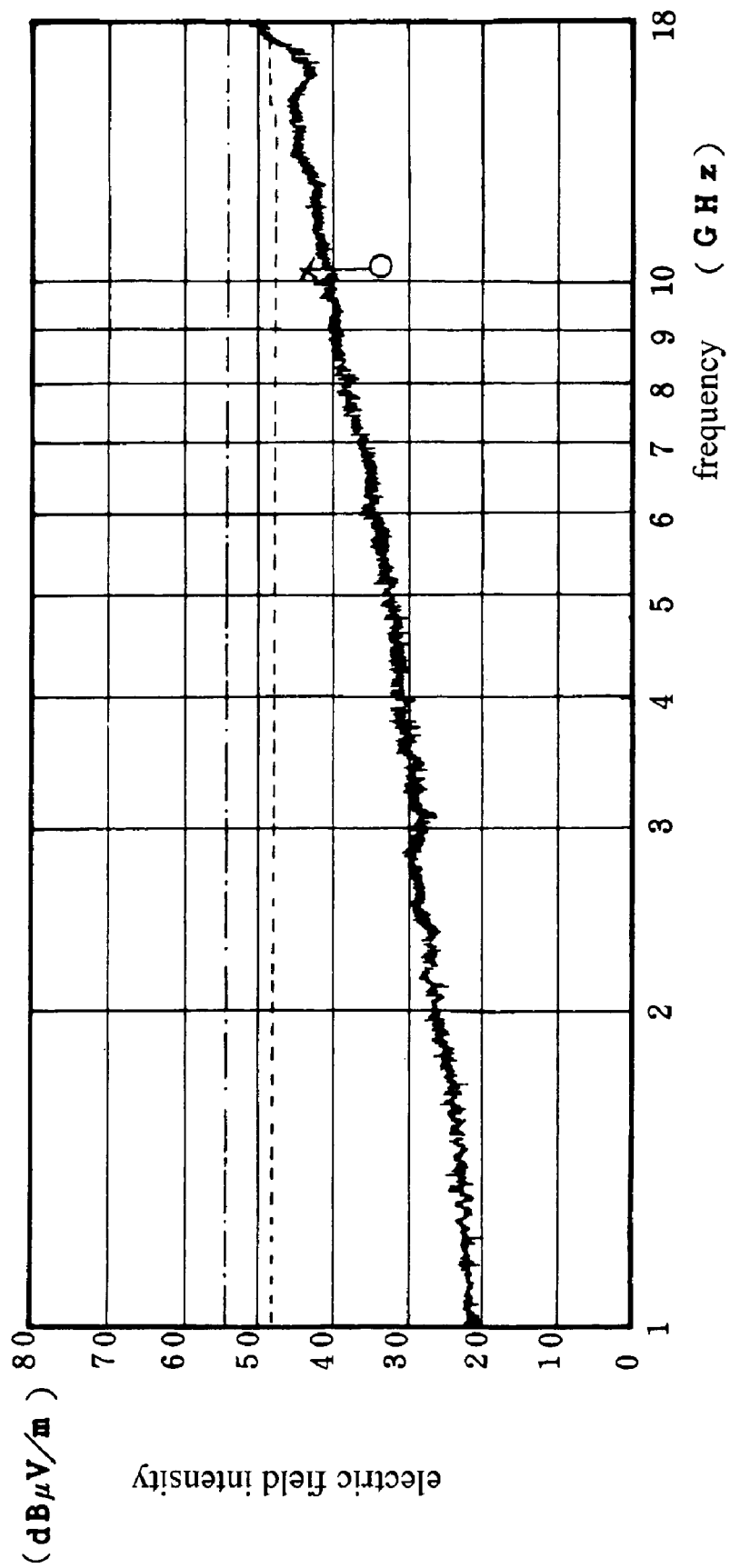
FIG. 5 is a graph of an electric field spectrum from 1 GHz to 18 GHz induced by an insulating ring carrying optoelectronic module of an embodiment driven at a fd=10.312 GHz frequency and measured per frequency by an antenna distanced by 3 meters from the optoelectronic module. The spectrum shows small noise levels of 33 dBμV/m (○) and 43 dBμV/m (x) at the driving frequency fd=10.312 GHz, which are lower than the standard critical value of 54 dBμV/m. The embodiment of the present invention satisfies the standard.
Figure 6:
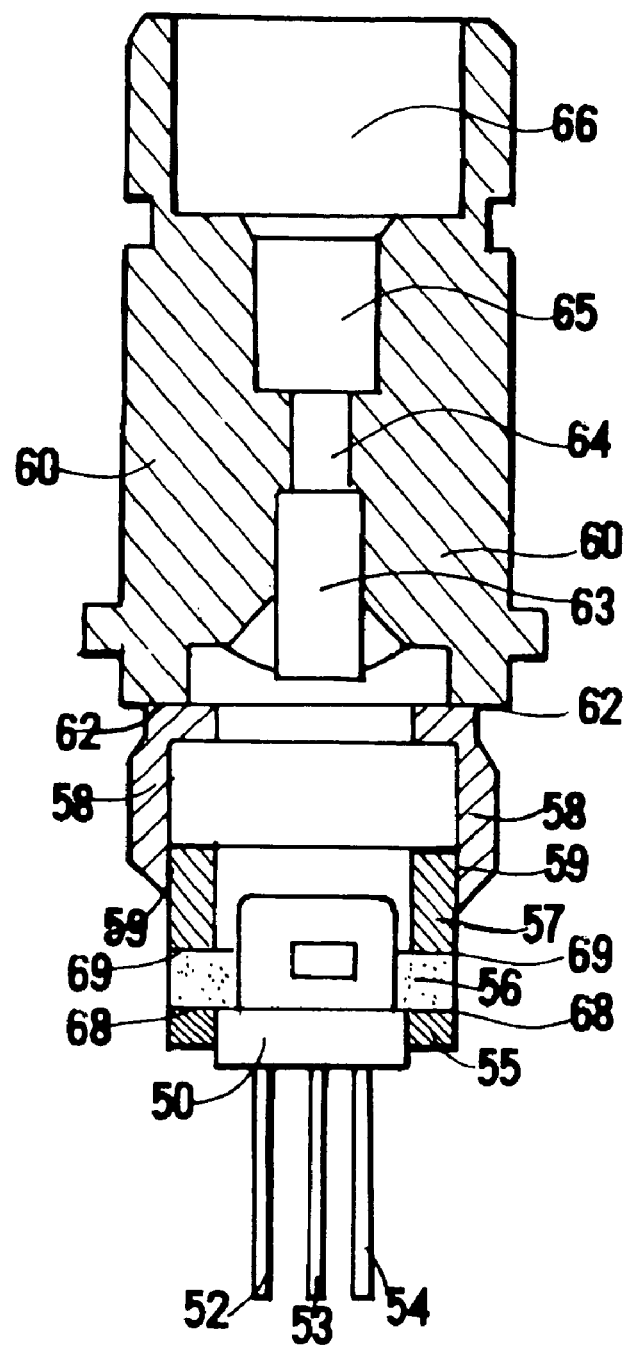
FIG. 6 is a sectional view of a prior art receptacle type module proposed by Japanese Utility Model Laying Open No. 4-130460 (130460/1992), "OPTOELECTRONIC RECEPTACLE MODULE".

FIG. 5 shows an intensity spectrum of electromagnetic waves emitted from the embodiment laser-holding optoelectronic module with the insulating ring measured by the apparatus shown in FIG. 7 placed in the electromagnetic shield chamber. The antenna of the apparatus is distanced by 3 meters from the object module. The abscissa denotes frequencies (GHz) of caught electromagnetic waves between 1 GHz and 18 GHz. The ordinate is electric field intensity (dBµV/m). The noise level of the background is similar to the previous result for the prior art module. The noise level is less than 40 dBµV/m between 1 GHz and 10 GHz also in the embodiment.

What matters is a noise level at the driving frequency fd=10.312 GHz. A round dot (○) in FIG. 5 shows an electric field component having a horizontal vector. The horizontal component of the electric field of 10.312 GHz is 33 dBµV/m, which is lower than the background level (about 40 dBµV/m). The cross dot (x) in FIG. 5 denotes the other electric field component having a vertical vector. The vertical component of the electric field at 10.312 GHz is 43 dBµV/m, which is also less than the critical value 54 dBµV/m of the FCC Part 15, Class B. The result of the measurement demonstrates that the driving frequency (10.312 GHz) given by the driving circuit to the laser diode does not fly outward from the module as a radio wave. The insulating ring succeeds in preventing the driving circuit from radiating noise radio waves. The present invention satisfies the standard of the FCC Part 15, Class B.

This invention divides the sleeve held between the package and the receptacle in the optoelectronic module into three parts composed of the metal, insulator and metal rings. The interposed insulation ring in the sleeve prevents the driving frequency from emitting radio wave noise outward in the case of light emitting modules. The insulation ring protects the module from external noise in the case of light detection modules.

The sleeve 9 is composed of the lower metal ring 5, the middle insulating ring 6 and the upper metal cover 7 which are arranged in a radial/vertical direction (slanting direction) and are unified into a body by press-fitting. The press-fitting dispenses with adhesives and simplifies the step of coupling. Use of an adhesive would induce unintentional eccentricity, positional errors and other imprecision. Press-fitting enables the present invention to secure precision of the parts. Since the insulating ring 6 is held between the inner (lower) metal ring 5 and the outer (upper) metal ring 7, the insulating ring 6 does not break under the protection of the outer metal ring 7. If the protrusion 28 is formed around the lower metal ring 5, heights of the parts are uniquely determined by the protrusion 28. The upper metal cover 7 made of a ferromagnetic material absorbs and shields electromagnetic waves. Noise emission is perfectly suppressed by the ferromagnetism of the upper metal cover 7.

We claim:

1. An optoelectronic module comprising:
   a metal stem;
   at least an optoelectronic device mounted on the stem;
   a lens holder fixed upon the stem and encapsulating the optoelectronic device;
   a lens sustained by the lens holder;
   a cylindrical lower metal ring being coupled with an outer surface of the lens holder by welding;
   an insulating ring being coupled with an outer surface of the lower metal ring by press-fitting without adhesive;
   a disc-shaped upper metal cover having a hole and being coupled with an outer surface of the insulating ring by press-fitting without adhesive; and
   a tubular receptacle fixed upon the upper metal cover for allowing a ferrule of an external optical fiber to be attached to and detached from.

2. The optoelectronic module according to claim 1, wherein the insulating ring is made of high-rigidity ceramics.

3. The optoelectronic module according to claim 1, wherein the insulating ring is made of sintered zirconia ($ZrO_2$).

4. The optoelectronic module according to claim 2, wherein the insulating ring has a gap.

5. The optoelectronic module according to claim 3, wherein the insulating ring has a gap.

6. The optoelectronic module according to claim 1, wherein the lower metal ring has an outer protrusion for regulating an intrusive depth of the insulating ring to the lower metal ring.

7. The optoelectronic module according to claim 2, wherein the lower metal ring has an outer protrusion for regulating an intrusive depth of the insulating ring to the lower metal ring.

8. The optoelectronic module according to claim 3, wherein the lower metal ring has an outer protrusion for regulating an intrusive depth of the insulating ring to the lower metal ring.

9. The optoelectronic module according to claim 4, wherein the lower metal ring has an outer protrusion for regulating an intrusive depth of the insulating ring to the lower metal ring.

10. The optoelectronic module according to claim 1, wherein the hole of the upper metal cover has a diameter from 0.2 mm to 1.2 mm.

11. The optoelectronic module according to claim 2, wherein the hole of the upper metal cover has a diameter from 0.2 mm to 1.2 mm.

12. The optoelectronic module according to claim 3, wherein the hole of the upper metal cover has a diameter from 0.2 mm to 1.2 mm.

13. The optoelectronic module according to claim 4, wherein the hole of the upper metal cover has a diameter from 0.2 mm to 1.2 mm.

14. The optoelectronic module according to claim 6, wherein the hole of the upper metal cover has a diameter from 0.2 mm to 1.2 mm.

15. The optoelectronic module according to claim 1, wherein the optoelectronic device is a laser diode.

16. The optoelectronic module according to claim 1, wherein the optoelectronic device is a pin photodiode.

17. The optoelectronic module according to claim 1, wherein the optoelectronic device is an avalanche photodiode.

18. The optoelectronic module according to claim 1, wherein the optoelectronic module is used for optical communications at a speed higher than 1 Gbps on a wavelength between 1.26 µm and 1.65 µm.

* * * * *